United States Patent
Hsieh

(10) Patent No.: US 11,446,796 B2
(45) Date of Patent: Sep. 20, 2022

(54) DETACHABLE FASTENING DEVICE

(71) Applicant: KABO TOOL COMPANY, Taichung (TW)

(72) Inventor: Chih-Ching Hsieh, Taichung (TW)

(73) Assignee: KABO TOOL COMPANY, Taichung (TW)

( * ) Notice: Subject to any disclaimer, the term of this patent is extended or adjusted under 35 U.S.C. 154(b) by 341 days.

(21) Appl. No.: 16/246,537

(22) Filed: Jan. 13, 2019

(65) Prior Publication Data
US 2019/0247986 A1  Aug. 15, 2019

(30) Foreign Application Priority Data
Feb. 13, 2018  (TW) ................. 107105339

(51) Int. Cl.
| | |
|---|---|
| *B25B 23/00* | (2006.01) |
| *F16B 21/16* | (2006.01) |
| *B25B 13/06* | (2006.01) |
| *F16B 23/00* | (2006.01) |

(52) U.S. Cl.
CPC .......... *B25B 23/0035* (2013.01); *B25B 13/06* (2013.01); *F16B 21/165* (2013.01); *F16B 23/0038* (2013.01)

(58) Field of Classification Search
CPC ............ B25B 23/0035; B25B 23/0078; B25B 23/0085; B25B 13/06; B25B 13/58; B25B 13/065; B25B 17/02; B25G 3/18; F16B 21/165; F16B 21/02; F16B 21/10; F16B 21/16; F16B 23/0038; F16B 23/0046
USPC ............................................. 81/121.1, 177.85
See application file for complete search history.

(56) References Cited

U.S. PATENT DOCUMENTS

| | | | | |
|---|---|---|---|---|
| 5,860,338 A | * | 1/1999 | Littlefield | B25B 15/001 81/177.2 |
| 6,406,240 B1 | * | 6/2002 | Potter | F16B 37/0864 411/270 |
| 7,104,163 B2 | * | 9/2006 | Hu | B25B 13/06 81/121.1 |
| 7,654,175 B2 | * | 2/2010 | Hamon | B25B 13/102 81/125 |
| 8,646,364 B2 | * | 2/2014 | Kang | B25B 13/065 81/121.1 |
| 8,931,377 B2 | * | 1/2015 | Wang | B25B 23/0035 81/180.1 |
| 9,566,692 B2 | * | 2/2017 | Seith | B25B 21/026 |
| 10,315,294 B2 | * | 6/2019 | Rettler | B25B 21/007 |
| 2008/0041193 A1 | * | 2/2008 | Baker | B25B 13/102 81/124.6 |
| 2010/0096790 A1 | * | 4/2010 | Huang | B25B 23/0035 269/49 |

(Continued)

*Primary Examiner* — Lee D Wilson
*Assistant Examiner* — Robert F Neibaur
(74) *Attorney, Agent, or Firm* — CKC & Partners Co., LLC

(57) ABSTRACT

A detachable fastening device includes a socket, a hollow disk and a positioning mechanism. The socket includes an external mounted base and at least one first depression located at the external mounted base. The hollow disk is detachably connected to the socket and includes an inner engaged wall coordinated with the external mounted base and at least one second depression located at the inner engaged wall. The positioning mechanism is received between the at least one first depression and the at least one second depression to position the socket and the hollow disk.

11 Claims, 10 Drawing Sheets

(56) References Cited

U.S. PATENT DOCUMENTS

| | | | |
|---|---|---|---|
| 2010/0175515 A1* | 7/2010 | Chen | B25B 23/0035 81/177.85 |
| 2014/0013905 A1* | 1/2014 | Li | B25B 13/06 81/124.4 |
| 2018/0311800 A1* | 11/2018 | Chu | B25B 21/02 |
| 2019/0126447 A1* | 5/2019 | Chu | B25B 21/023 |

* cited by examiner

DETACHABLE FASTENING DEVICE

RELATED APPLICATIONS

This application claims priority to Taiwan Application Serial Number 107105339, filed Feb. 13, 2018, which is herein incorporated by reference.

BACKGROUND

Technical Field

The present disclosure relates to a fastening device. More particularly, the present disclosure relates to a detachable fastening device.

Description of Related Art

Development of lighter and handier hand tools becomes the most recently trend. Consequently, fastening devices are seeking for lightweight and small size in order to respond to market demands. However, for ratable fastening operation, a specific torque is needed to fasten screws, nuts or other elements so as to ensure the securing effect; hence, how to achieve the specific torque while compacted is a concerned problem.

Therefore, some practitioners developed a socket with a block. The inertia force of the block caused by rotation of the socket can enhance the securing effect. However, removal of the block is not allowed. As a result, the manufacturing difficulty and the demand for large receiving space become other problems. Moreover, since the socket with the block has only one function, the usage thereof becomes limited.

Based on the abovementioned problems, how to develop a fastening device with advantages of easily detachable structure and multi-functions becomes a pursuit target for practitioners.

SUMMARY

The present disclosure provides a detachable fastening device including a socket, a hollow disk and a positioning mechanism. The socket includes an external mounted base and at least one first depression located at the external mounted base. The hollow disk is detachably connected to the socket and includes an inner engaged wall coordinated with the external mounted base and at least one second depression located at the inner engaged wall. The positioning mechanism is received between the at least one first depression and the at least one second depression to position the socket and the hollow disk.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
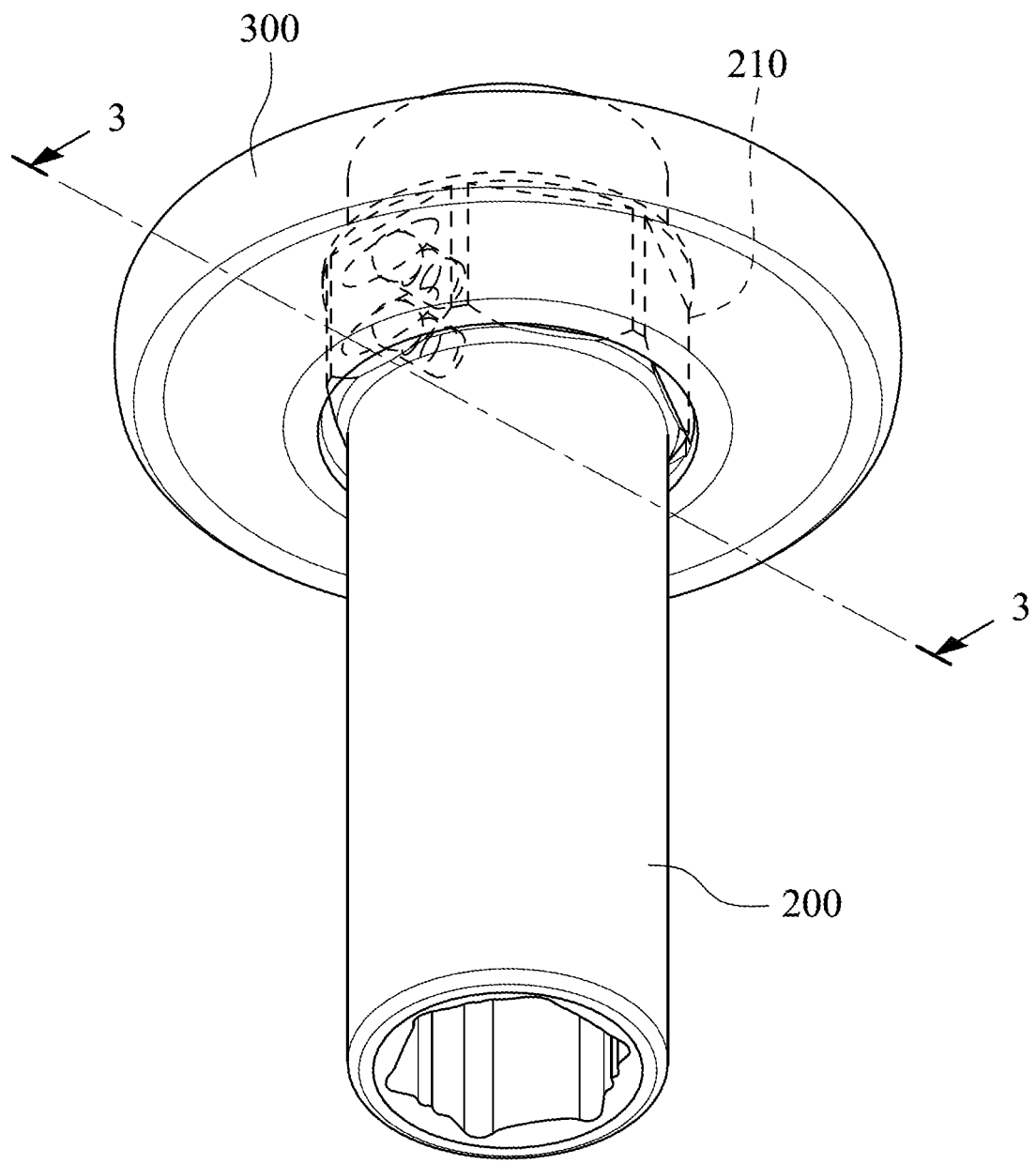
FIG. 1 is a schematic view of a detachable fastening device according to one embodiment of the present disclosure.
Figure 2:
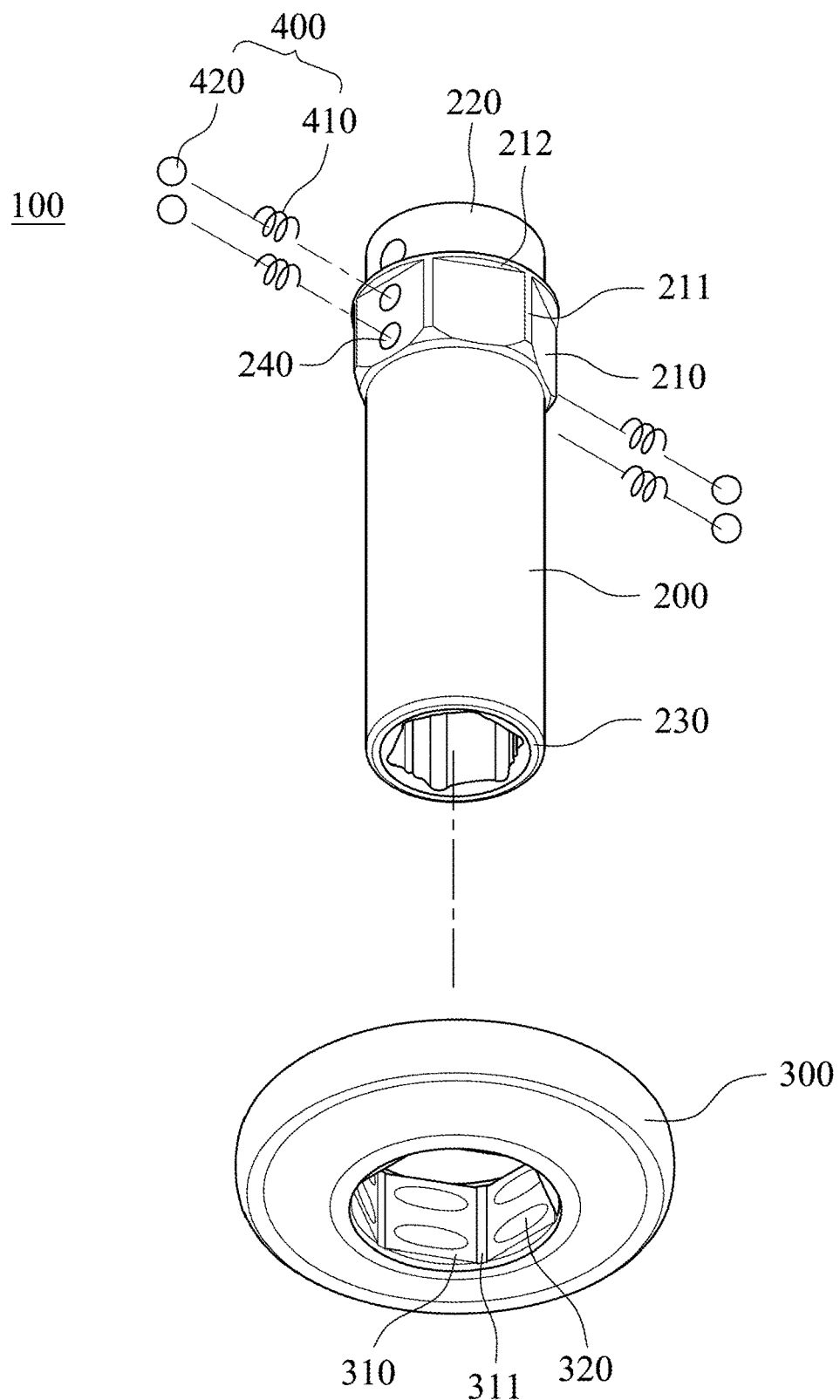
FIG. 2 is an exploded view of the detachable fastening device of FIG. 1.

Please refer to FIG. 1, FIG. 2, FIG. 3, FIG. 4, FIG. 5, FIG. 6 and FIG. 7. A detachable fastening device 100 can connect to a driven tool 500 (shown in FIG. 6) to rotate a work piece and includes a socket 200, a hollow disk 300 and a positioning mechanism 400.

The socket 200 includes an external mounted base 210 and at least one first depression 240 located at the external mounted base 210. The hollow disk 300 is detachably connected to the socket 200 and includes an inner engaged wall 310 coordinated with the external mounted base 210 and at least one second depression 320 located at the inner engaged wall 310. The positioning mechanism 400 is received between the at least one first depression 240 and the at least one second depression 320 to position the socket 200 and the hollow disk 300.

Therefore, through the configuration of the positioning mechanism 400, the hollow disk 300 can be detachably connected to the socket 200. When the hollow disk 300 is connected to the socket 200, the socket 200 can be connected to the driving tool 500 to be served as an impact socket. When the hollow disk 300 is separated from the socket 200, the hollow disk 300 can be coupled to a to-be-rotated element by the inner engaged wall 310 to rotate the to-be-rotated element. In addition, the socket 200 can be connected to the driving tool 500 to be served as a common connecting socket. Hence, the detachable fastening device 100 has a wide diversity of usage.

The socket 200 has a cylinder structure and an axial direction I. The socket 200 further includes a driven end 220 and a fastening end 230. The driven end 220 has an inner square hole configured for connecting to a driving head 510 of the driving tool 500 with ball detent. The fastening end 230 has an inner hexagon hole configured for detachably connecting to a work piece. Hence, rotation of the driving head 510 of the driving tool 500 causes the socket 200 to rotate such that the work piece is fastened or loosened owing to the rotation of the socket 200. The driving tool 500 can be an electric wrench, an air wrench or a torque wrench, and the work piece can be a screw, a nut or a bolt.

The outer wall of the socket 200 is protruded in a radial direction to form the external mounted base 210. The external mounted base 210 of the embodiment has an equilateral hexagon cross-sectional shape; thus, the external mounted base 210 has six surfaces (not labeled). The external mounted base 210 can further include six longitudinal ribs 211 spaced from each other, and each of the longitudinal ribs 211 is integrally connected between two surfaces. In the embodiment, a number of the first depressions 240 is four. Two of the first depressions 240 are located at one side of the external mounted base 210 and spaced from one another along the axial direction I, and the other two of the first depressions 240 are located at another side of the external mounted base 210. The above-mentioned the other two of the first depressions 240 correspond to the above-mentioned two of the first depressions 240, respectively. Precisely, the above-mentioned two of the first depressions 240 are located at one of the surfaces, and the above-mentioned the other two of the first depressions 240 are located at another one of the surfaces which is opposite to the above-mentioned one of the surfaces. Each of the first depressions 240 can have a circular blind-hole structure. In other embodiments, the external mounted base can have an equilateral polygon cross-sectional shape, i.e., an equilateral square cross-sectional shape. The outer mounded base can have a plum flower cross-sectional shape and a plurality of longitudinal ribs, and a number of the longitudinal ribs corresponds to the plum flower cross-sectional shape. The external mounted base can have at least two first depressions located at one side of the external mounted base and spaced from one another along the axial direction, but it is not limited thereto.

The inner engaged wall 310 of the hollow disk 300 is shaped to correspond to the external mounted base 210. Hence, the inner engaged wall 310 can include six inner surfaces. The inner engaged wall 310 can further include six limiting grooves 311 corresponding to the six longitudinal ribs 211. Each of the limiting grooves 311 is spaced apart from each other and is located at an intersection between two inner surfaces. Each of the second depressions 320 has an oval blind-hole structure, and a number of the second depressions 320 is twelve. Each of the surfaces has two of the second depressions 320 located thereon along the axial direction I with an interval. In other embodiment, the number of the second depressions 320 is four and the positions of the second depressions are corresponding to the four first depressions 240. When the number of the second depressions 320 is twelve, the hollow disk 300 can be connected to the socket 200 from any angles. Additionally, in other embodiment, the inner engaged wall can be shaped to correspond to the external mounted base. The inner engaged wall can have an inner square structure or a plum flower structure, and can have a plurality of limiting grooves. A number of the limiting grooves corresponds to the cross-sectional shape of the inner engaged wall. A number of the second depressions is larger than two and corresponds to the first depressions.

The positioning mechanism 400 can include an elastic body 410 and a ball 420. The elastic body 410 is disposed at the first depression 240. The ball 420 is urged by the elastic body 410 into the second depressions 320. In FIGS. 1 to 4, a number of the elastic bodies 410 is four, and each of the elastic bodies 410 is positioned in each of the first depressions 240. A number of the balls 420 is four, and one of the balls 420 is urged by the elastic body 410 which is disposed at one of the first depressions 240 into the second depression 320 which corresponds to the above-mentioned one of the first depressions 240. In other embodiment, the number of the elastic bodies is larger than or equal to two, and each of the elastic bodies is positioned in each of the first depressions. The number of the balls is larger than or equal to two.

Figure 3:
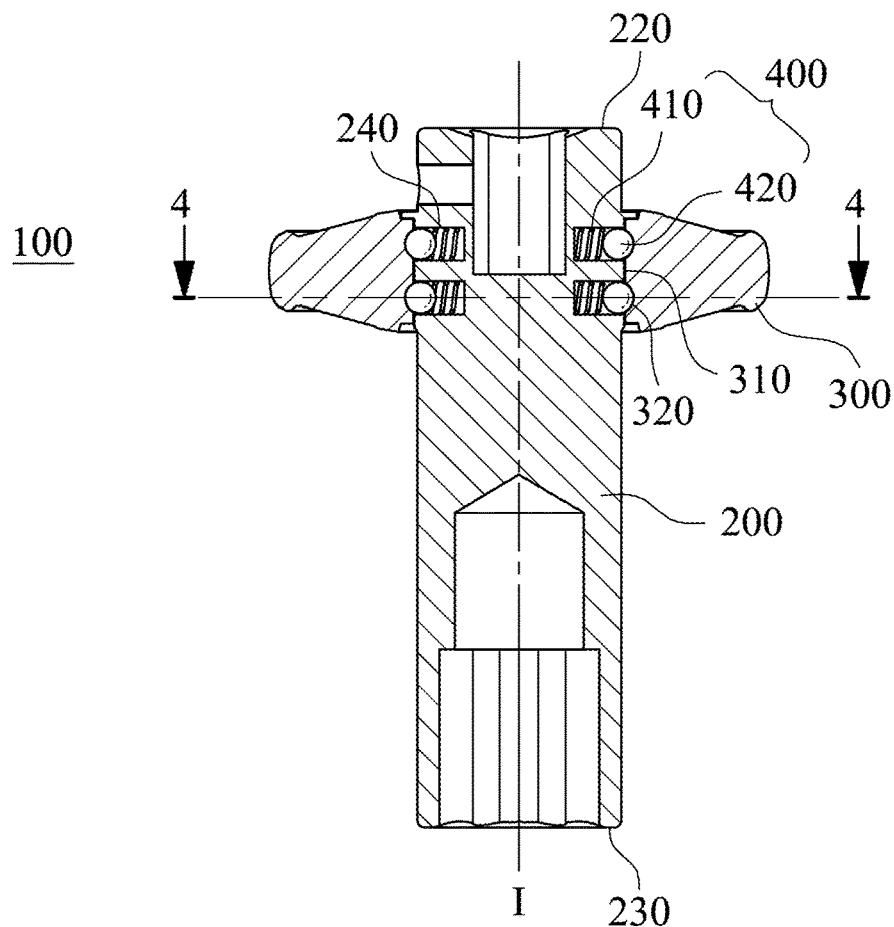
FIG. 3 is a cross-sectional view of the detachable fastening device of FIG. 1 taken along line 3-3.
Figure 4:
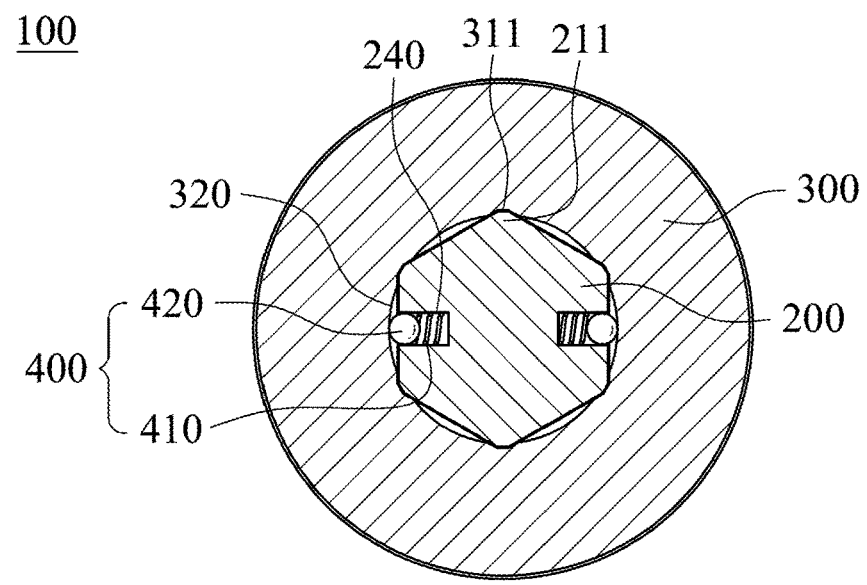
FIG. 4 is a cross-sectional view of the detachable fastening device of FIG. 3 taken along line 4-4.

In other words, each of the elastic bodies 410 is received within each of the first depressions 240, and the ball 420 is pushed by the elastic body 410. Thus, as shown in FIGS. 3 and 4, when the hollow disk 300 is connected to the socket 200, each of the six longitudinal ribs 211 is engaged with each of the six limiting grooves 311 such that rotation of the hollow disk 300 relative to the socket 200 is prohibited. The ball 420 is pushed by the elastic body 410 to abut against the second depression 320, and the hollow disk 300 are completely connected to the socket 200.

Figure 5:
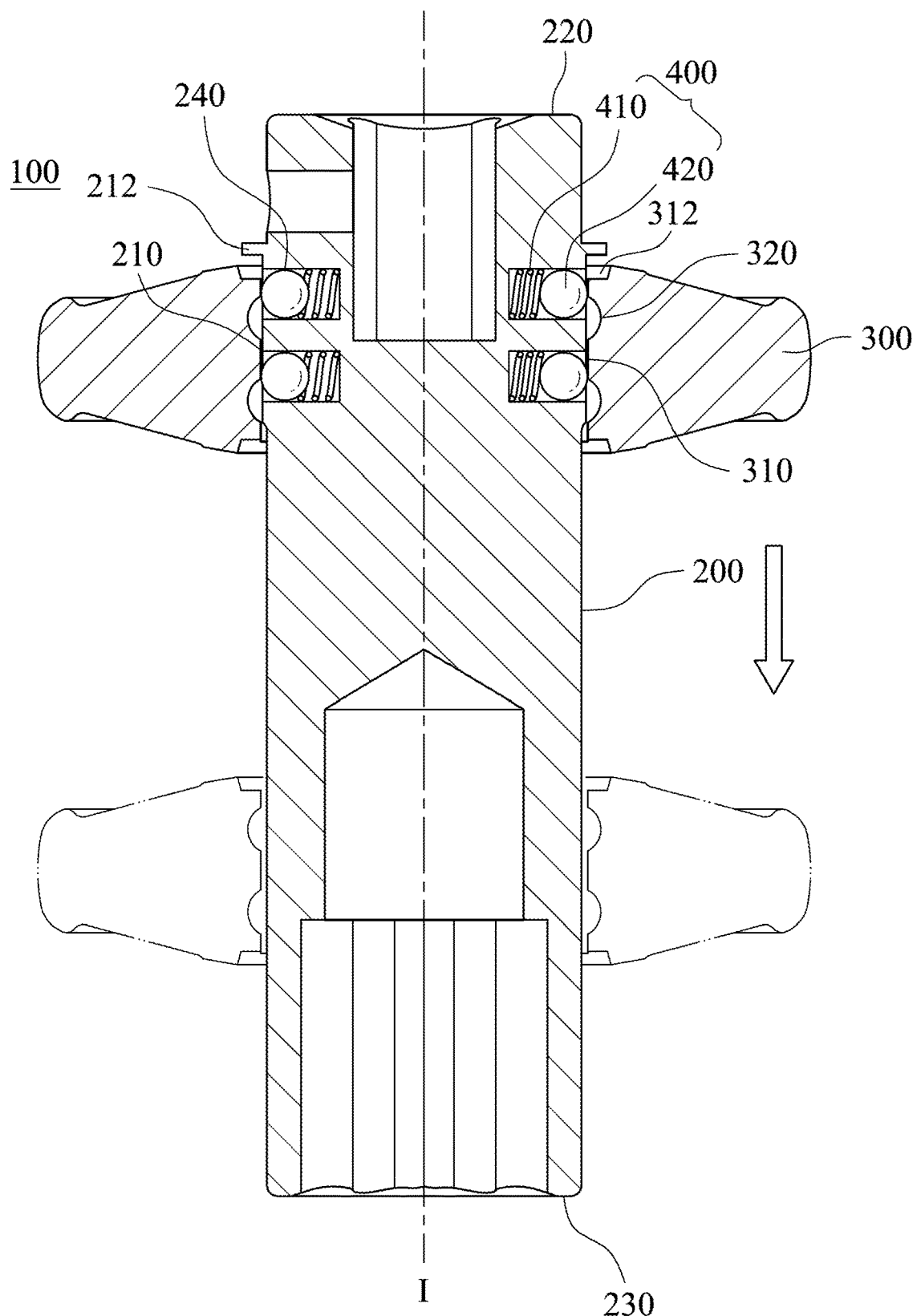
FIG. 5 is a schematic view showing removal of a hollow disk of the detachable fastening device of FIG. 3.

As shown in FIG. 5, because the elastic body 410 can be pressed to allow the ball 420 to leave the second depression 320, removal of the hollow disk 300 can be done by moving the hollow disk 300 long the axial direction I. Hence, the hollow disk 300 can be separated from the socket 200.

In addition, the external mounted base 210 can further include a limiting flange 212 protruded outward from a main body of the external mounted base 210. The inner engaged wall 310 can include a concave end 312 corresponding to the limiting flange 212. Accordingly, when connecting the hollow disk 300 to the socket 200, the hollowing ring 300 is sleeved into the socket 200 from the fastening end 230 and moved upward along the axial direction I until the concave end 312 is abutted against the limiting flange 212 such that the hollow disk 300 can be positioned.

Figure 6:
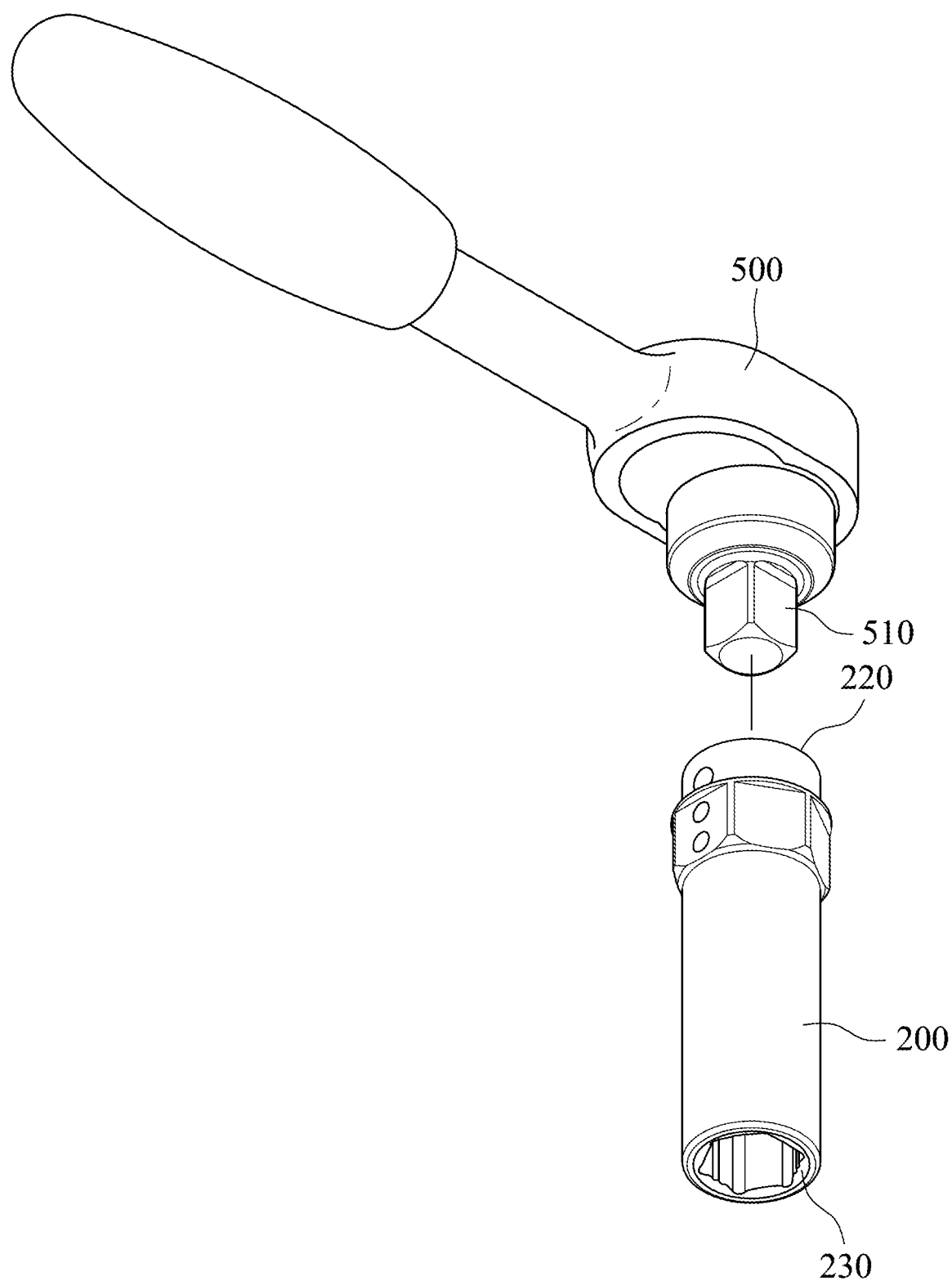
FIG. 6 is a schematic view showing an application of a socket of the detachable fastening device of FIG. 1.
Figure 7:
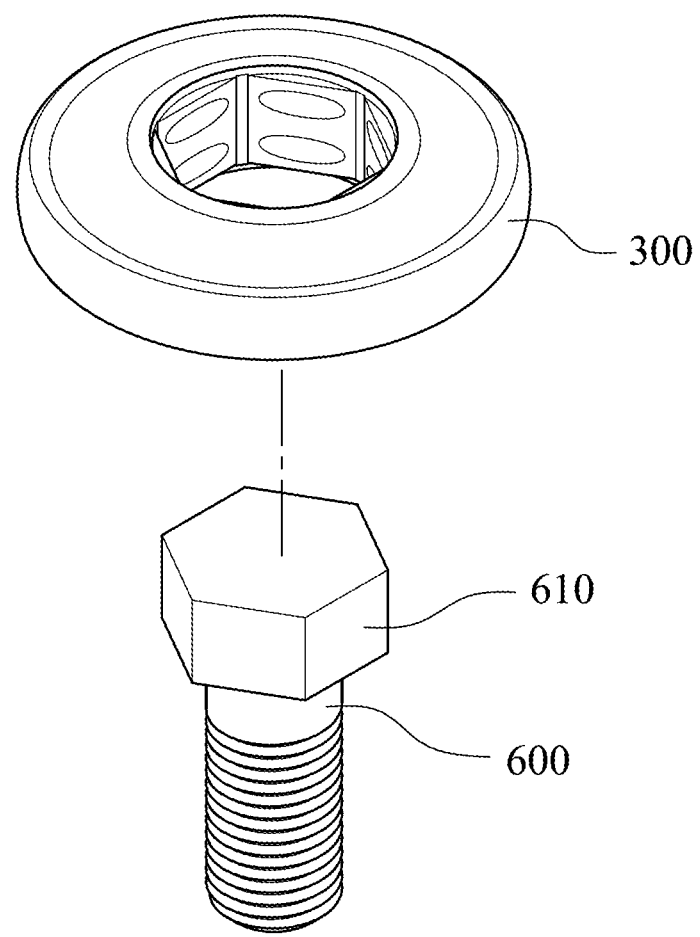
FIG. 7 is a schematic view showing an application of the hollow disk of the detachable fastening device of FIG. 1.
Figure 8:
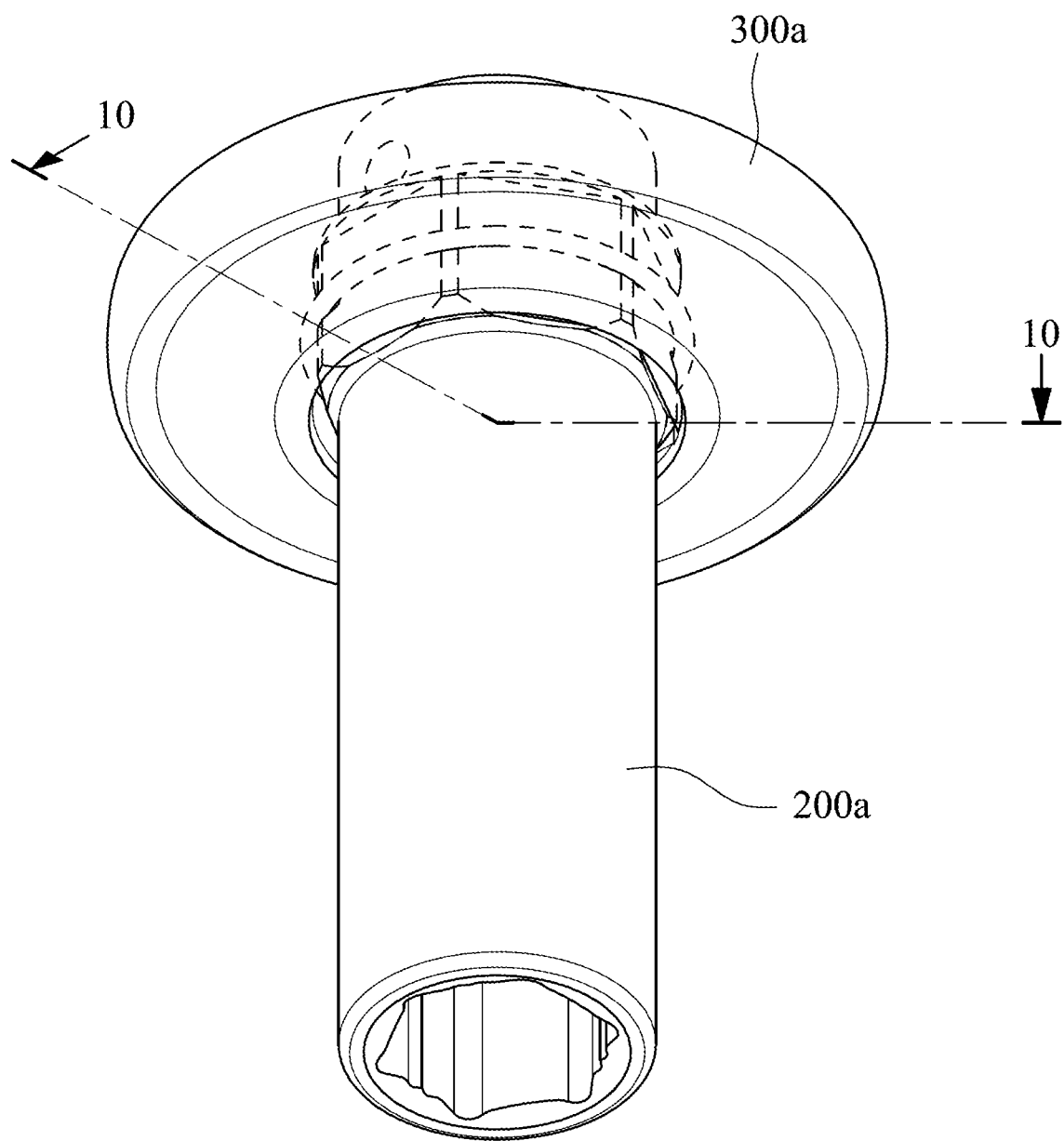
FIG. 8 is a schematic view of a detachable fastening device according to another embodiment of the present disclosure.
Figure 9:
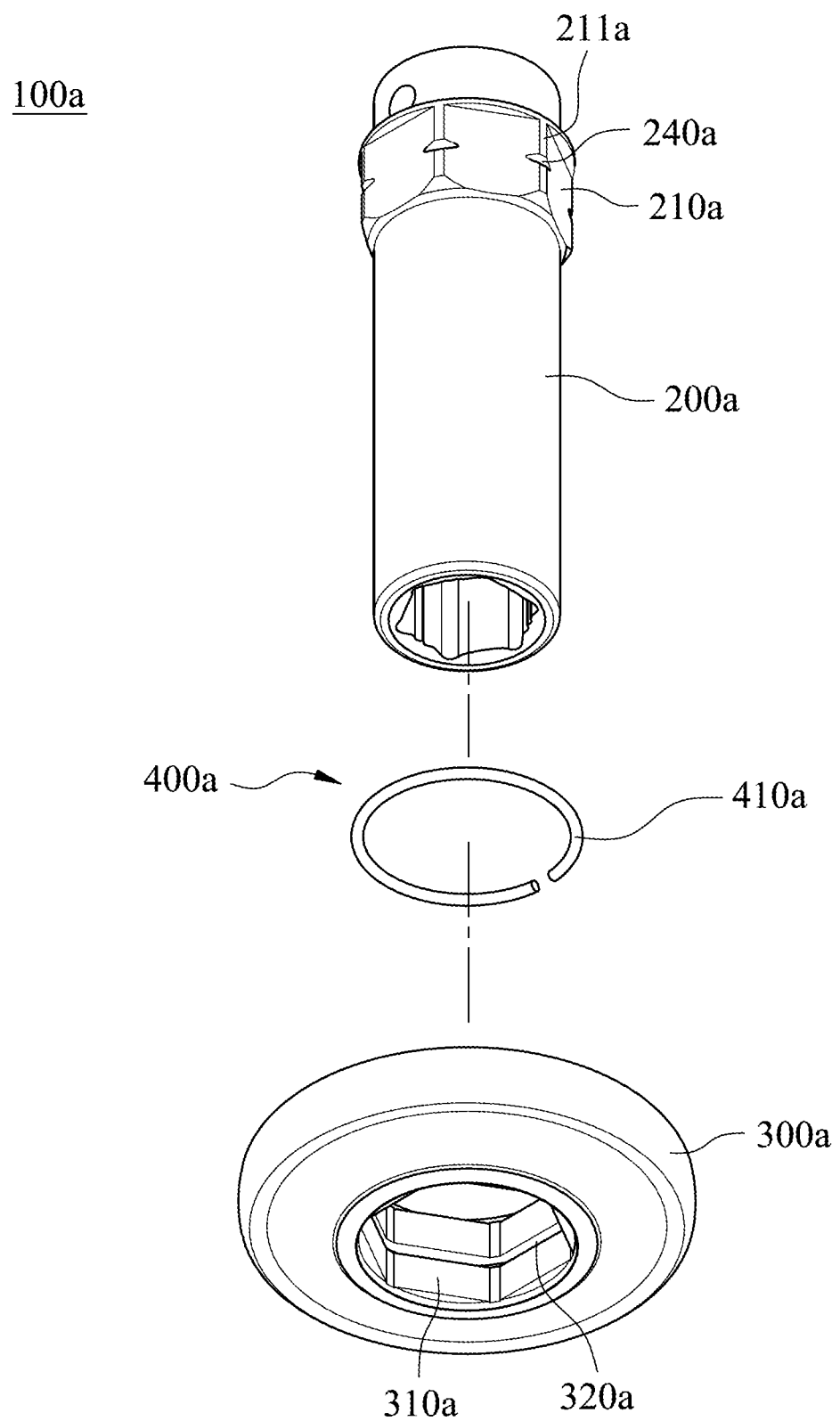
FIG. 9 is an exploded view of the detachable fastening device of FIG. 8.
Figure 10:
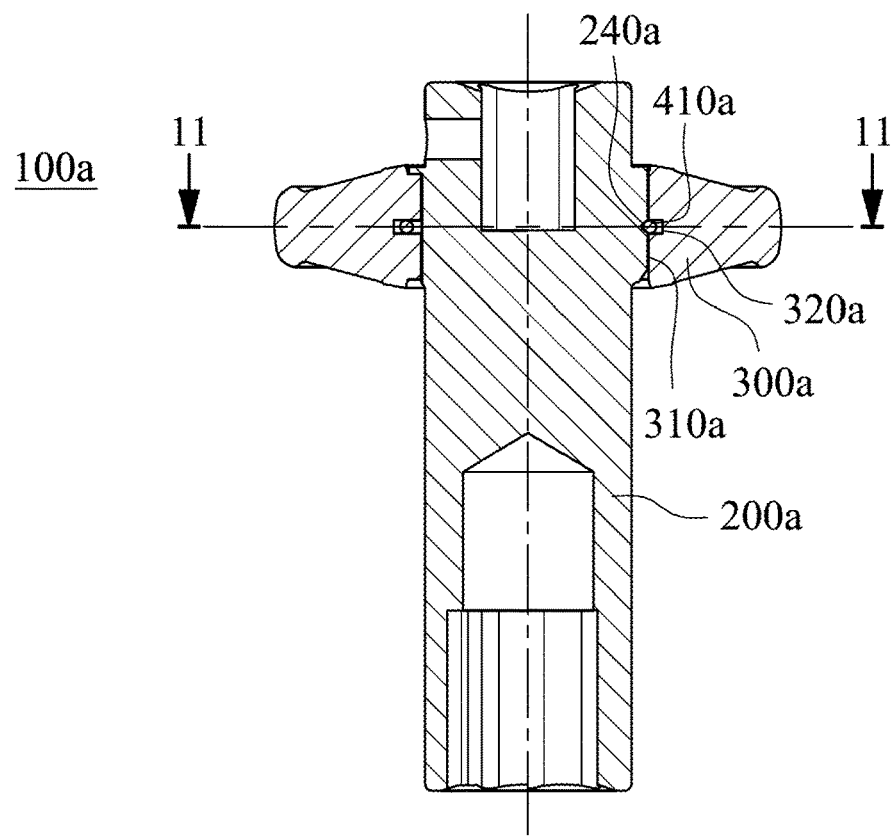
FIG. 10 is a cross-sectional view of the detachable fastening device of FIG. 8 taken along line 10-10.
Figure 11:
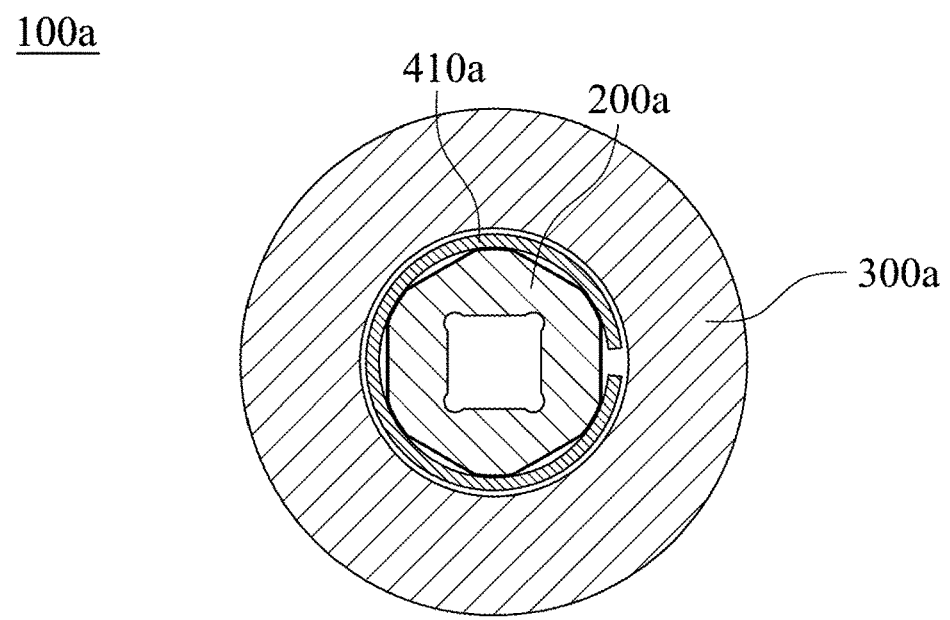
FIG. 11 is a cross-sectional view of the detachable fastening device of FIG. 10 taken along line 11-11.

Because the hollow disk 300 can be separated from the socket 200, the socket 200, as shown in FIG. 6, can be severed as a common connecting socket to connect to a driving head 510 of the driving tool 500. Additionally, as shown in FIG. 7, the hollow disk 300 can be engaged with an external hex-head cap 610 of a bolt 600 and rotate the bolt 600. Hence, the detachable fastening device 100 can have a wide diversity of usage. The inner engaged wall of the hollow disk can be shaped to correspond to other to-be-rotated element of different shape.

Please refer to FIG. 8, FIG. 9, FIG. 10 and FIG. 11. The detachable fastening device 100a includes a socket 200a, a hollow disk 300a and a positioning mechanism 400a. The structure of the socket 200a and the hollow disk 300a are similar to the structure of the socket 200 and the hollow disk 300 shown in FIGS. 1 to 4. The socket 200a includes the external mounted base 210a and the first depressions 240a, and the hollow disk 300a includes the inner engaged wall 310a and the second depression 320a. Because the positioning mechanism 400a is different from the positioning mechanism 400 shown in FIGS. 1 to 4, the detail structure of the socket 200a and the hollow disk 300a will be a little different from the detail structure of the socket 200 and the hollow disk 300 shown in FIGS. 1 to 4.

To be more specific, the positioning mechanism 400a can include a C-shape ring 410a positioned between the socket 200a and the hollow disk 300a. A space formed between the first depression 240a and the second depression 320a is for receiving the C-shaped ring 410a. A number of the first depressions 240a is six, and each of the first depressions 240a is located at each of the longitudinal ribs 211a. The second depression 320a has an annular groove structure. In other embodiment, the external mounted base has an equilateral polygon cross-sectional shape, and a number of the first depressions is equal to a number of vertexes of the equilateral polygon cross-sectional shape. Each of the first depressions is located at each of the longitudinal ribs.

Each of the first depressions 240a on the longitudinal rib 211a has a notch structure. Each of the longitudinal ribs 211a has one of the first depressions 240a located thereon. The second depression 320a is located at the inner engaged wall 310a to separate the inner engaged wall 310a into an upper part and a lower part. Before connecting the hollow disk 300a to the socket 200a, the C-shaped ring 410a can be sleeved onto the external mounted base 210a and limited by the first depressions 240a. Then the hollow disk 300a can be sleeved on to the C-shaped ring 410a to cause the radial deformation of the C-shaped ring 410a. Since the position of the second depression 320a corresponds to the first depressions 240a, the space can be formed for receiving the C-shaped ring 410a. Hence, when the deformed C-shaped ring 410a is restored, it can be positioned within the space and secure the hollow disk 300a such that the assembly between the socket 200a and the hollow disk 300a can be completed. On the other hand, when separating the socket 200a from the hollow disk 300a, movement of the hollow disk 300a along the axial direction can deform the C-shaped ring 410a; as a result, the hollow disk 300a can be separated from the socket 200a.

Figure 12:
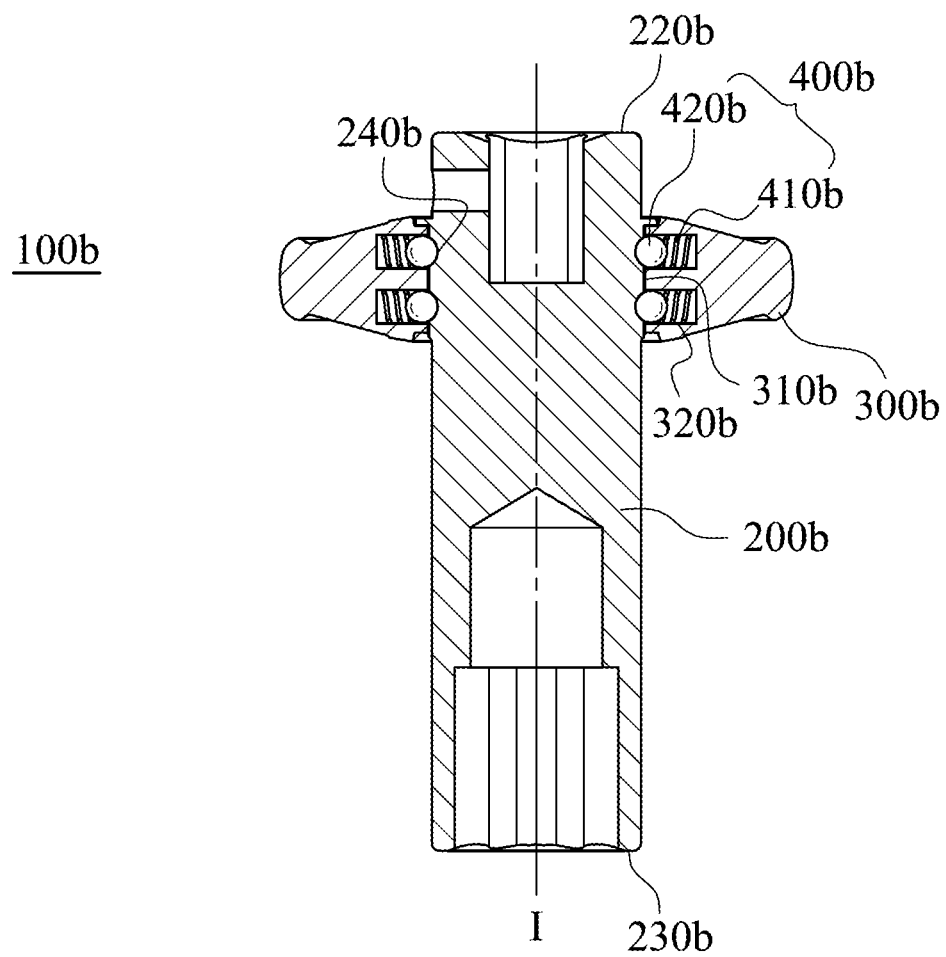
FIG. 12 is a cross-sectional view of a detachable fastening device according to yet another embodiment of the present disclosure.

Please refer to FIG. 12. The detachable fastening device 100b includes a socket 200b, a hollow disk 300b and a positioning mechanism 400b. The structure of the socket 200b and the hollow disk 300b are similar to the structure of the socket 200 and the hollow disk 300 shown in FIGS. 1 to 4. The socket 200b includes the driven end 220b, the fastening end 230b, the external mounted base, and the first depressions 240b. The hollow disk 300b includes the inner engaged wall 310b and the second depressions 320b, and the positioning mechanism 400b includes a plurality of elastic bodies 410b and a plurality of balls 420b. The difference between the positioning mechanism 400b and the positioning mechanism 400 shown in FIGS. 1 to 4 is that each of the elastic bodies 410b is received in each of the second depressions 320b, and each of the balls 420b is urged by the elastic body 410b into the first depression 240b.

Through the configuration of the positioning mechanism 400b, the socket 200b can be connected to the hollow disk 300b. When separating the hollow disk 300b from the socket 200b, movement of the hollow disk 300b along the axial direction allows the balls 420b to leave the first depressions 240b; as a result, the hollow disk 300b can be separated from the socket 200b.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A detachable fastening device, comprising:
    a socket, comprising:
        an external mounted base comprising a limiting flange;
        at least one first depression located at the external mounted base; and
        a fastening end;
    a fastener detachably connected to the socket and comprising:
        a central hole having an inner engaged wall coordinated with the external mounted base, wherein the inner engaged wall comprises a concave end corresponding to the limiting flange; and
        at least one second depression located at the inner engaged wall; and
    a positioning mechanism received between the at least one first depression and the at least one second depression to position the socket and the fastener;
    wherein a length of the fastener is shorter than half of a length of the socket, an outer diameter of the limiting flange is larger than an outer diameter of the fastening end, an axial thickness of the limiting flange is equal to an axial thickness of the concave end, and when the fastener is assembled with the socket, the fastener is moved upward until the concave end is abutted against the limiting flange, and the fastener is located between a central point of the socket and an end surface of the socket.

2. The detachable fastening device of claim 1, wherein the external mounted base comprises a plurality of longitudinal ribs spaced from each other, the inner engaged wall comprises a plurality of grooves corresponding to the longitudinal ribs, and each of the grooves is for engaging with each of the longitudinal ribs.

3. The detachable fastening device of claim 2, wherein the external mounted base has an equilateral polygon cross-sectional shape.

4. The detachable fastening device of claim 3, wherein the external mounted base has an equilateral hexagon cross-sectional shape, a number of the longitudinal ribs is six, and a number of the grooves is six.

5. The detachable fastening device of claim 3, wherein the positioning mechanism comprises a C-shaped ring positioned between the socket and the fastener, and a space formed between the at least one first depression and the at least one second depression is for receiving the C-shaped ring.

6. The detachable fastening device of claim 5, wherein a number of the at least one first depression is equal to a number of vertexes of the longitudinal ribs of the equilateral polygon cross-sectional shape, and each of the first depressions is located at each of the longitudinal ribs.

7. The detachable fastening device of claim 6, wherein the at least one second depression has an annular groove structure.

8. The detachable fastening device of claim 1, wherein the positioning mechanism comprises:
    at least one elastic body disposed at the at least one first depression; and
    at least one ball urged by the elastic body into the at least one second depression.

9. The detachable fastening device of claim 8, wherein the socket has an axial direction, at least two first depressions are located at one side of the external mounted base and spaced from one another along the axial direction, at least two second depressions are corresponding to the at least two first depressions, a number of the at least one elastic body is at least two, each of the at least two elastic bodies is disposed at each of the at least two first depressions, a number of the at least one ball is at least two, and one of the at least two balls is urged by one of the at least two elastic bodies which is disposed at one of the at least two first depressions into one of the at least two second depressions which corresponds to the one of the at least two first depressions.

10. The detachable fastening device of claim 9, wherein each of the at least two first depressions has a circular blind-hole structure, and each of the at least two second depressions has an oval blind-hole structure.

11. The detachable fastening device of claim 1, wherein the positioning mechanism comprises:
    an elastic body disposed at the at least one second depression; and a ball urged by the elastic body into the at least one first depression.

* * * * *